United States Patent [19]
Hase et al.

[11] Patent Number: 4,765,192
[45] Date of Patent: Aug. 23, 1988

[54] TORQUE SENSOR

[75] Inventors: Hiroyuki Hase, Katano; Ichiro Yamashita, Hirakata; Shinya Tokuono, Ashiya; Masayuki Wakamiya, Suita, all of Japan

[73] Assignee: Matsushita Electric Industrial Co., Ltd., Osaka, Japan

[21] Appl. No.: 928,408

[22] Filed: Nov. 10, 1986

[30] Foreign Application Priority Data

Nov. 13, 1985 [JP] Japan ................. 60-254120

[51] Int. Cl.$^4$ ............................................. G01L 3/10
[52] U.S. Cl. ................................................ 73/862.36
[58] Field of Search ............... 73/862.36, 779, DIG. 2

[56] References Cited

U.S. PATENT DOCUMENTS 4,414,855 11/1983 Iwasaki ..................... 73/862.36
4,506,554 3/1985 Blomkvist et al. ............. 73/862.36

FOREIGN PATENT DOCUMENTS 0044839 3/1985 Japan ..................... 73/862.36
0079240 5/1985 Japan ..................... 73/862.36
0838448 6/1981 U.S.S.R. .................. 73/862.36

*Primary Examiner*—Charles A. Ruehl
*Attorney, Agent, or Firm*—Stevens, Davis, Miller & Mosher

[57] ABSTRACT

A torque sensor which includes a pair of multiple thread portions integrally formed in the surface of a rotating shaft in such a manner that one of the multiple thread portions forms a positive angle with the thrust direction of the rotating shaft and the other forms a negative angle with the thrust direction. The threads of the multiple thread portions are at least made of soft magnetic alloy having magnetostrictive properties. A pair of coils are arranged concentrically on the outer side of the multiple thread portions at a given distance therefrom. The strain produced in the surface of the rotating shaft is detected as inductance changes of the coils when the permeability of the soft magnetic alloy changes. The direction and magnitude of the torque are detected because of the difference between the inductances of the coils.

4 Claims, 4 Drawing Sheets

DIFFERENTIAL OUTPUT

DIFFERENTIAL DETECTING CIRCUIT — 5

DIFFERENTIAL OUTPUT

TORQUE SENSOR

BACKGROUND OF THE INVENTION

1. Field of the Invention

The present invention relates to a non-contact torque sensor for detecting the torque transmitted to a rotating shaft.

2. Description of the Related Art

There has been known in the art a torque sensor which is constructed as shown in FIG. 6. In FIG. 6, numeral 1 designates a rotating shaft, and 3 designates a pair of amorphous magnetic alloy pieces, each formed into an elongated shape and each having magnetostrictive properties. The amorphous magnetic alloy pieces 3 are helically fastened on the rotating shaft 1 to respectively form angles of +45° and −45° with respect to the thrust direction thereof. Coils 4a and 4b are respectively wound concentrically in the outer sides corresponding to, and apart by a given distance from, the portions on which the amorphous magnetic alloy pieces 3 are wound and the coils 4a and 4b are connected to a differential detecting circuit 5. When a torque is transmitted to the rotating shaft 1, a strain is produced in each of the amorphous magnetic alloy pieces 3. This strain alters the permeabilities of the alloy thus changing the inductance values of coils 4a and 4b. At this time, the inductance change for the torque differs between the amorphous magnetic alloy piece 3 wound at the angle of +45° with the thrust direction and the amorphous magnetic alloy piece 3 wound at −45°. As a result, the magnitude and direction of the torque can be detected from the resulting differential output in the differential detecting circuit 5.

With the torque sensor constructed as described above, its sensitivity is best when only the helical amorphous magnetic alloy piece 3 of +45° has a sensitivity to a right-hand torque and when only the helical amorphous magnetic alloy piece 3 of −45° has a sensitivity to a left-hand torque, respectively. However, due to the nonuniform stress, etc. caused during the adhesion, the respective alloy pieces 3 are strained by either positive or negative torques, thus deteriorating the sensitivity of the torque sensor. There is another disadvantage in that the amorphous magnetic alloy pieces 3 are fastened on the surface of the rotating shaft 1 with an adhesive, thus failing to ensure a sufficient adhesion strength.

SUMMARY OF THE INVENTION

It is an object of the present invention to provide a torque sensor having improved sensitivity.

To accomplish the above object, the invention provides a torque sensor including a pair of multiple thread portions integrally formed in the surface of a rotating shaft to respectively form positive and negative angles with the thrust direction of the shaft, each thread of the multiple thread portions at least made of a soft magnetic alloy having magnetostrictive properties, and a pair of coils arranged concentrically in the outer side of the multiple thread portions at a given distance therefrom respectively, whereby a strain produced in the surface of the shaft by a torque is detected in terms of changes in the inductances of the coils through changes in the permeabilities of the soft magnetic alloy and the torque is detected from the difference between the inductances of the coils.

DESCRIPTION OF THE PREFERRED EMBODIMENTS

Figure 1:
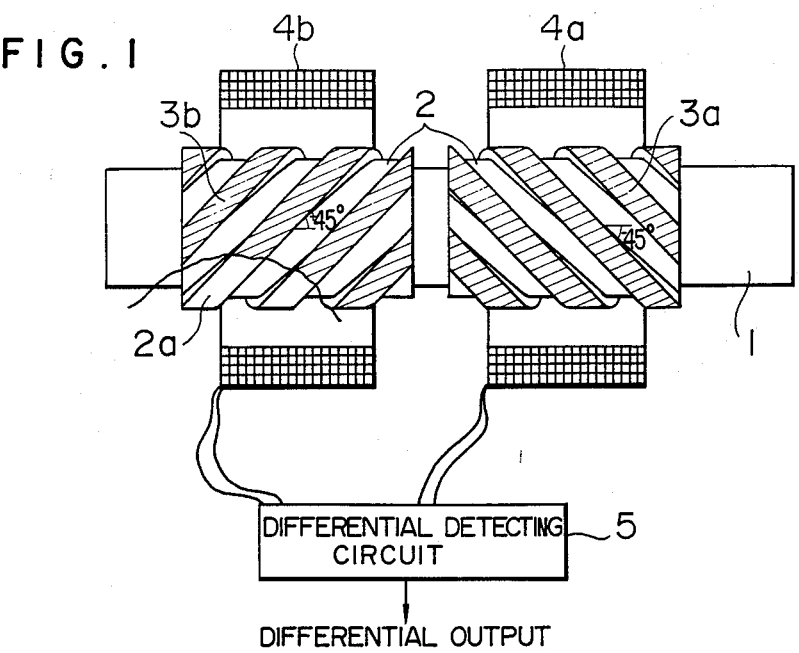
FIG. 1 is a schematic diagram showing the construction of an embodiment of the invention.

FIG. 1 illustrates a torque sensor according to an embodiment of the invention. In the Figure, numeral 1 designates a rotating shaft made of 45% Ni steel (a linear expansion coefficiency; $8.0 \times 10^{-6}$ (1/°C.)). Numeral 2 designates a pair of multiple thread portions formed on the shaft 1 of 20 mm$\phi$ to form pitch angles of +45° and −45°, respectively. In the Figure, each of the multiple thread portions includes five threads. Fe-base magnetostrictive amorphous magnetic alloys 3a and 3b are applied and layered, along with an epoxy adhesive, onto threads 2a of the multiple thread portions 2, respectively. The amorphous magnetic alloy has a linear expansion coefficiency of $7.4 \times 10^{-6}$ (1/°C.). Coils 4a and 4b, which are connected to a differential detecting circuit 5, are arranged concentrically with the rotating shaft 1 in the outer side of the multiple thread portions 2 so as to convert the change of the permeabilities of the amorphous magnetic alloys 3a and 3b to the change of inductances. There are 200 turns in each coil 4a and 4b. The magnetic field generated by each coil is 1 Oe at 25 KHZ.

The operation of the above torque sensor is as follows. When a right-hand torque is transmitted to the rotating shaft 1, there occurs a change in the permeability of the amorphous magnetic alloy 3b which is adhered to threads 2a. These threads form the +45° multiple thread portion 2. On the other hand, no change occurs in the permeability of the amorphous magnetic alloy 3a which is adhered to the multiple thread portion 2 having the −45° slope. When a left-hand torque is transmitted to the shaft 1, the reverse relation is established. The differential detecting circuit 5 generates a differential output of coils 4a and 4b by a bridge circuit, thereby simultaneously detecting the magnitude and direction of a torque given to shaft 1.

Figure 2:
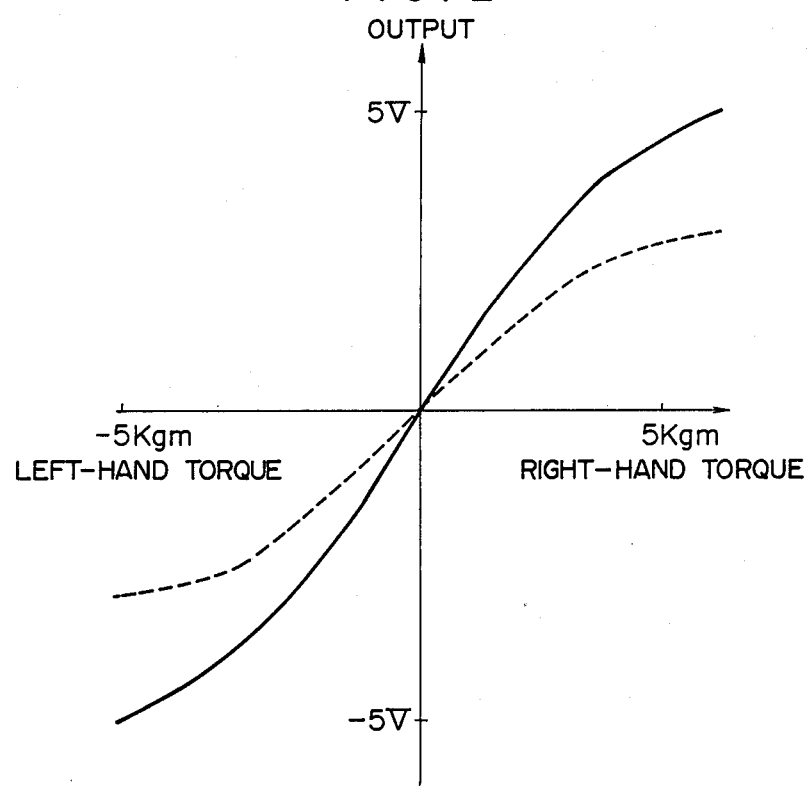
FIG. 2 is a torque sensor output characteristic diagram comparing the preferred embodiment with a conventional torque sensor.

In FIG. 2, the solid line shows the output of the torque sensor according to the invention. The broken line in FIG. 2 shows the output of the conventional torque sensor employing the Fe-base amorphous magnetic alloy pieces of the same shape. It will thus be seen that the output sensitivity of the torque sensor according to the invention is improved.

When the rotatoing shaft 1 is made of Ti material having a linear expansion coefficiency of $9.4 \times 10^{-6}$ (1/°C.) and a linear expansion coefficiency of the Fe-base amorphous magnetic alloys 3a and 3b is $7.4 \times 10^{-6}$ (1/°C.), the resulting torque sensor outputs at −30° C., 60° C. and 130° C., respectively, are as shown in FIG.

Figure 3A:
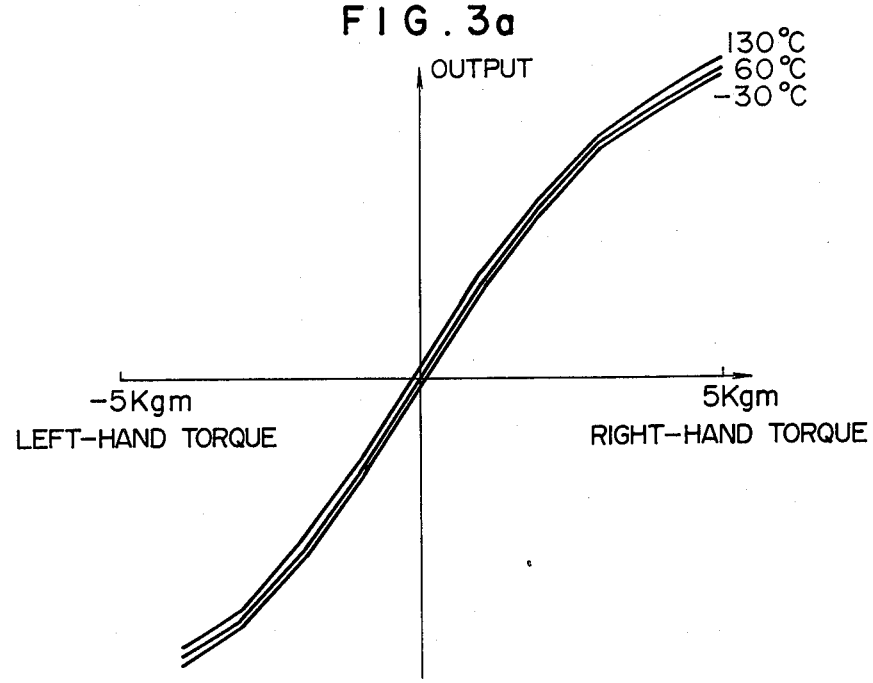
FIGS. 3a and 3b show temperature characteristic diagrams for the torque sensor of the invention and the conventional torque sensor.
Figure 3B:
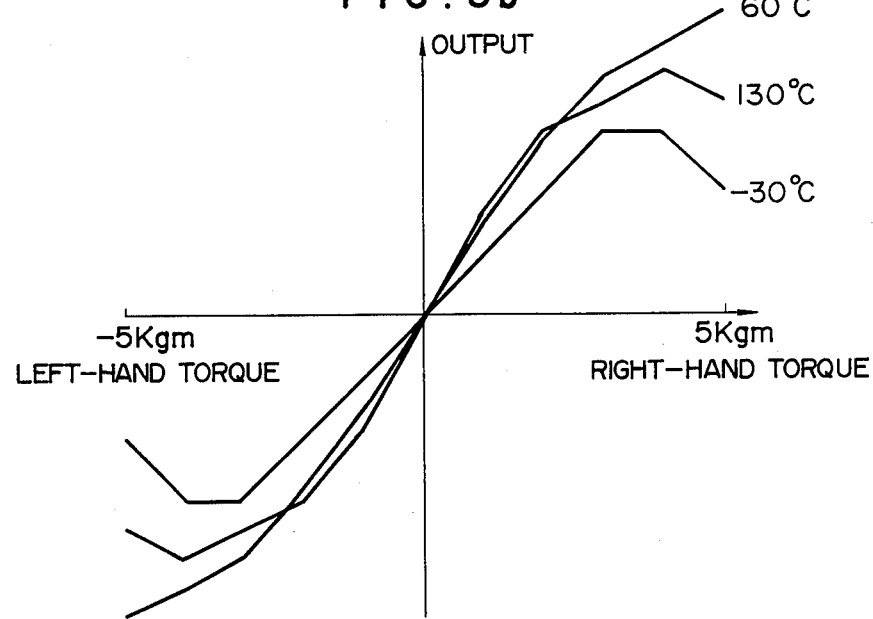

3a. For purposes of comparison, FIG. 3b shows the corresponding outputs obtained with a rotating shaft 1 made of S35C material (a linear expansion coefficiency; $11.6 \times 10^{-6}$ (1/°C.)). It will be seen that the torque sensor realized by the present invention has less sensitivity to temperature changes.

By selecting the difference between the linear expansion coefficiencies of the shaft material and the amorphous magnetic alloy less than $2.0 \times 10^{-6}$ (1/°C.), it is possible to generate a satisfactory output at a temperature in the range of −30° C. to 130° C.

In accordance with the above-described embodiment of the invention, the sensitivity of the torque sensor is enhanced by virtue of a pair of the multiple thread portions which have respective pitch angles of +45° and −45° with respect to the thrust direction of rotating shaft 1. Also, the difference between the linear expansion coefficiencies of the shaft material and the amorphous magnetic alloy is selected to be less than $2 \times 10^{-6}$ (1/°C.). This difference has the effect of ensuring the generation of a satisfactory detecting output in the differential detecting circuit 5 at a temperature between −30° C. and 130° C.

While this embodiment has been described for a thread pitch angle of 45°, the same concept applies with pitch angles other than 45°.

Figure 4:
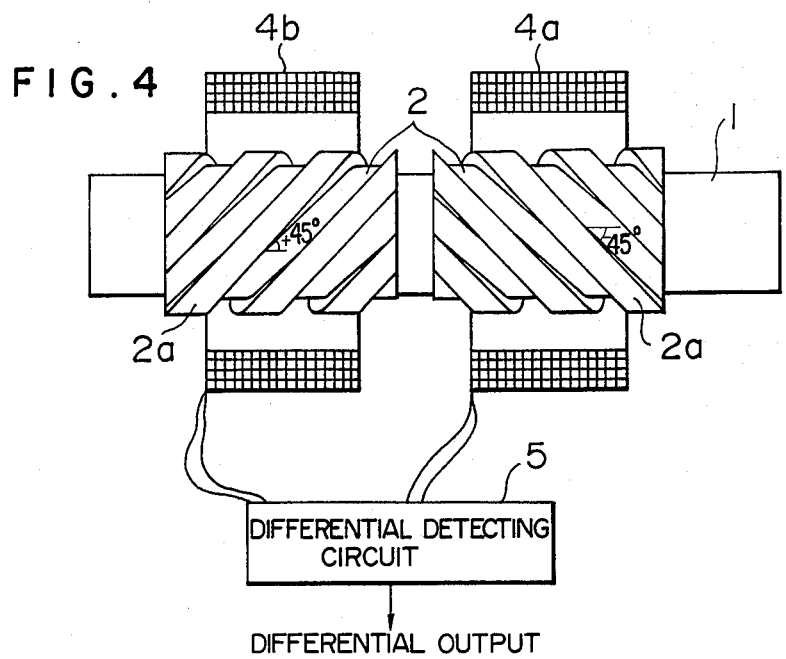
FIG. 4 is a schematic diagram showing the construction of another embodiment of the invention.

Referring to FIG. 4, there is illustrated a torque sensor according to another embodiment of the invention. In the Figure, numeral 1 designates a rotating shaft made of 48% Ni steel (soft magnetic alloy) having magnetostrictive properties. Two multiple thread portions 2 are integrally formed in the surface of the rotating shaft 1 so as to respectively form pitch angles of +45° and −45°. The bottoms of the multiple thread portions 2 are covered with nonmagnetic metal, such as aluminum, so that magnetic flux can pass only through the threads of thread portions 2. Coils 4a and 4b are arranged in the outer side of the multiple thread portions 2 and are connected to a differential detecting circuit 5. With this construction, no amorphous magnetic alloy is used and the magnetostrictive properties of the rotating shaft 1 are utilized.

Figure 5:
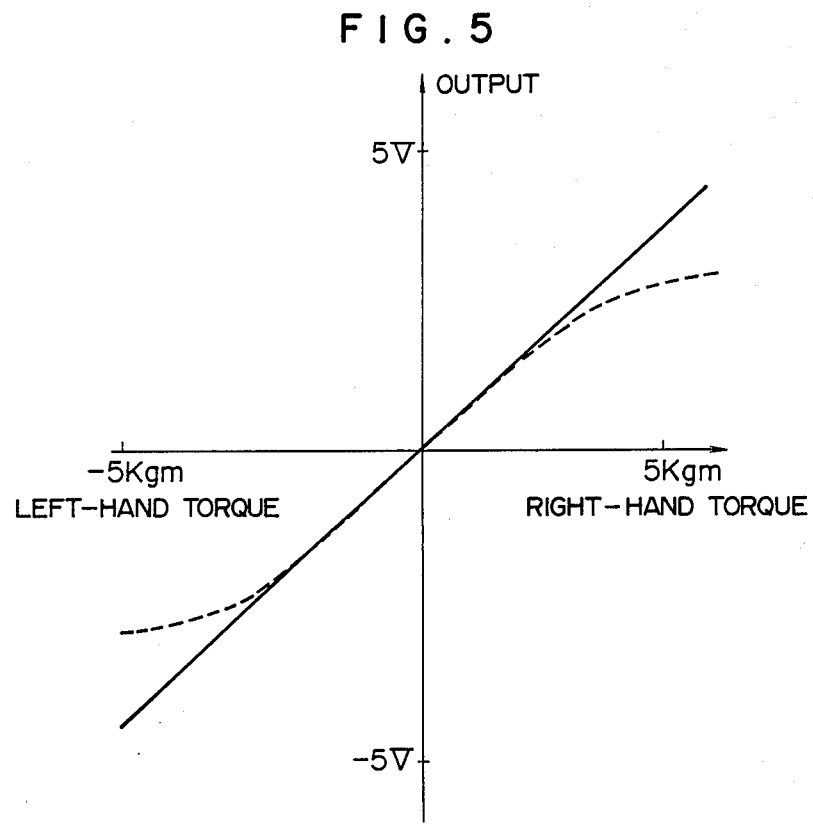
FIG. 5 is a torque sensor output characteristic diagram comparing the embodiment shown in FIG. 4 with the conventional torque sensor.
Figure 6:
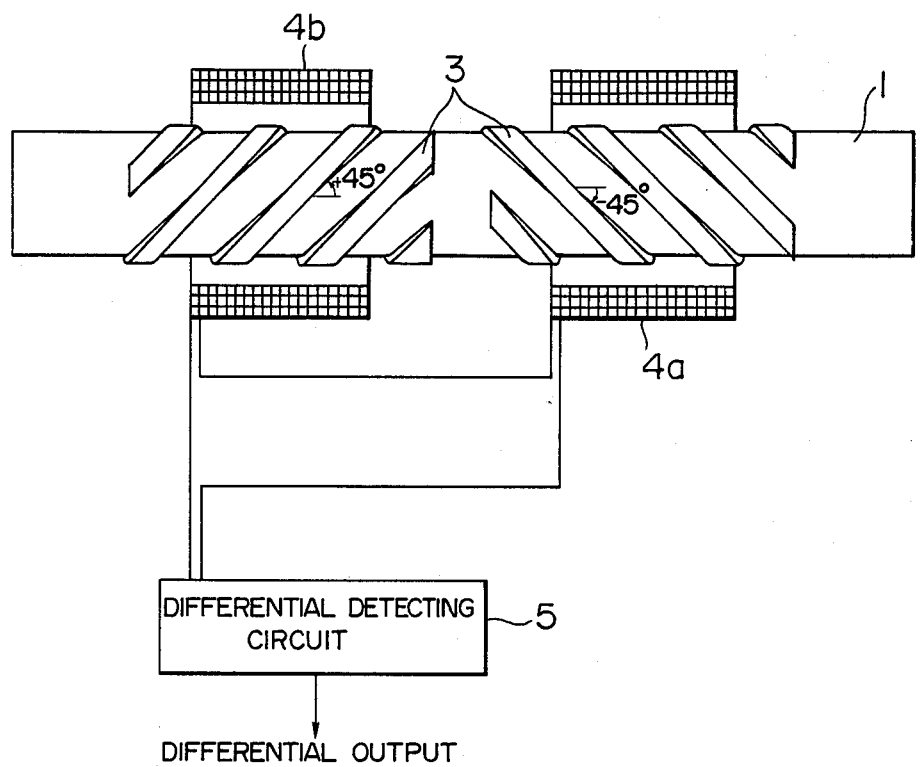
FIG. 6 is a schematic diagram showing the construction of the conventional torque sensor.

FIG. 5 shows the output characteristics of the torque sensor described above. The measuring frequency is 10 KHZ and the excitation field is about 12 Oe. In the Figure, the solid line shows the output of the torque sensor according to the invention, and the broken line shows the output of the conventional torque sensor. The linearity with the torque is satisfactory and the sensitivity is improved. In addition, the durability is improved due to the use of no adhesive.

When the rotating shaft itself is made of soft magnetic material having magnetostrictive properties, a torque sensor with fine durability can be realized by making use of the magnetostrictive properties of the rotating shaft. Accordingly, there is no need to apply the magnetostrictive amorphous magnetic alloy layer onto each thread of the multiple thread portions.

We claim:

1. A torque sensor comprising:
    a pair of multiple thread portions integrally formed in the surface of a rotating shaft in a manner that one of said multiple thread portions forms a positive angle with a thrust direction of said rotating shaft and the other of said multiple thread portions forms a negative angle with said thrust direction, the threads of said multiple thread portions at least being made of a soft magnetic alloy having magnetostrictive properties; and
    a pair of coils arranged concentrically in the outer side of said multiple thread portions at a predetermined distance therefrom respectively,
    whereby a strain produced in the surface of said rotating shaft by a torque is detected as inductance changes of said coils through permeability changes of said soft magnetic alloy, and said torque is detected from a difference between the inductances of said coils.

2. A torque sensor according to claim 1, wherein said rotating shaft is made of soft magnetic alloy as a whole.

3. A torque sensor comprising:
    a pair of multiple thread portions integrally formed in the surface of a rotating shaft such that one of said multiple thread portions forms a positive angle with respect to a thrust direction of said rotating shaft and the other of said multiple thread portions forms a negative angle with respect to said thrust direction,
    a soft magnetic alloy layer applied onto each thread of said multiple thread portions, and
    a pair of coils arranged concentrically in the outer side of said multiple thread portions at a predetermined distance therefrom respectively,
    whereby a strain produced in the surface of said rotating shaft by a torque is detected as inductance changes of said coils through permeability changes of said soft magnetic alloy layer, and said torque is detected from a difference between the inductances of said coils.

4. A torque sensor according to claim 3, wherein the difference between the linear expansion coefficients of said rotating shaft and said soft magnetic alloy layer is $2 \times 10^{-6}$ (1/°C.) or less.

* * * * *